US010867530B2

(12) United States Patent
White (10) Patent No.: US 10,867,530 B2
(45) Date of Patent: Dec. 15, 2020

(54) DISPLAY MOUNTING SYSTEM AND METHOD

(71) Applicant: K-International, Inc., Waukegan, IL (US)

(72) Inventor: Michael J. White, Ripon, WI (US)

(73) Assignee: K-International, Inc., Waukegan, IL (US)

( * ) Notice: Subject to any disclaimer, the term of this patent is extended or adjusted under 35 U.S.C. 154(b) by 0 days.

(21) Appl. No.: 16/243,643

(22) Filed: Jan. 9, 2019

(65) Prior Publication Data

US 2019/0147776 A1 May 16, 2019

Related U.S. Application Data

(62) Division of application No. 15/079,481, filed on Mar. 24, 2016, now Pat. No. 10,269,271, which is a
(Continued)

(51) Int. Cl.
*G09F 7/00* (2006.01)
*G09F 7/18* (2006.01)
(Continued)

(52) U.S. Cl.
CPC ............... *G09F 7/18* (2013.01); *A47F 13/06* (2013.01); *A47G 1/1686* (2013.01); *B25B 5/04* (2013.01); *B25B 5/06* (2013.01); *B25J 1/04* (2013.01); *G09F 7/22* (2013.01); *E04B 9/006* (2013.01); *G09F 2007/186* (2013.01); *G09F 2007/1847* (2013.01); *G09F 2007/1852* (2013.01); *Y10T 29/49826* (2015.01)

(58) Field of Classification Search
CPC ....... G09F 7/18; G09F 15/0018; A47F 5/0838

USPC ............ 248/301, 30, 304, 544; 40/601, 617
See application file for complete search history.

(56) References Cited

U.S. PATENT DOCUMENTS 4,564,165 A 1/1986 Grant et al.
4,641,448 A 2/1987 Cobb et al.
(Continued)

FOREIGN PATENT DOCUMENTS

FR 2936896 A1 4/2010

OTHER PUBLICATIONS

Hooked on Magnets, Website by Freedom's Design LLC, Copyright 2014, 2 pages.

*Primary Examiner* — Steven M Marsh
(74) *Attorney, Agent, or Firm* — Schiff Hardin LLP (57) ABSTRACT

A system and method for mounting a display or sign includes an elongated channel having magnets that are affixed to a ceiling grid and mounting hooks or the like to suspend the sign or display from the channel. The channel includes high friction strips on a neck for engagement by a pole end gripper on a pole for mounting the channel on the ceiling while the user stands on the floor. End caps may be mounted on the channel. Mounting plates may be affixed to the ceiling or wall for magnetically engaging the channel. A wall mount channel includes an offset neck for gripping by the pole end gripper. A magnetic clip including a string for suspending a display may be mounted with the pole end gripper. An embodiment of the channel includes hooks for engaging an open girder ceiling, horizontal member, or other structure.

22 Claims, 9 Drawing Sheets

Related U.S. Application Data division of application No. 14/248,899, filed on Apr. 9, 2014, now Pat. No. 9,697,754.

(60) Provisional application No. 61/953,214, filed on Mar. 14, 2014.

(51) Int. Cl.
*B25J 1/04* (2006.01)
*A47F 13/06* (2006.01)
*A47G 1/16* (2006.01)
*B25B 5/04* (2006.01)
*G09F 7/22* (2006.01)
*B25B 5/06* (2006.01)
*E04B 9/00* (2006.01)

(56) References Cited

U.S. PATENT DOCUMENTS

| | | |
|---|---|---|
| 5,188,332 A | 2/1993 | Callas |
| 5,381,991 A | 1/1995 | Stocker |
| 5,456,034 A | 10/1995 | Lewis et al. |
| 5,499,789 A * | 3/1996 | Rose ............... A47F 5/0892 248/317 |
| 5,806,823 A | 9/1998 | Callas |
| 5,938,255 A * | 8/1999 | Rose ................. A47F 13/06 248/340 |
| 6,334,602 B1 | 1/2002 | Clarke |
| 6,435,464 B1 | 8/2002 | Sullivan et al. |
| 7,065,912 B2 | 6/2006 | Pitcher |
| 8,474,168 B2 | 7/2013 | Wick |
| 2005/0160648 A1* | 7/2005 | Voluckas ............. G09F 7/20 40/617 |
| 2011/0099866 A1* | 5/2011 | Pitcher ............... G09F 7/20 40/611.01 |
| 2013/0039079 A1* | 2/2013 | Lutzke ............... F21S 8/061 362/396 |
| 2013/0291415 A1* | 11/2013 | Stein ................. A47G 1/1686 40/601 |
| 2013/0333197 A1* | 12/2013 | Schulte ............... B25J 1/04 29/525.08 |

\* cited by examiner

DISPLAY MOUNTING SYSTEM AND METHOD

CROSS-REFERENCE TO RELATED APPLICATION

This application is a divisional patent application of U.S. patent application Ser. No. 15/079,481, filed Mar. 24, 2016, which is a divisional patent application of U.S. patent application Ser. No. 14/248,899, filed Apr. 9, 2014, now issued as U.S. Pat. No. 9,697,754 on Jul. 4, 2017, each of which are incorporated herein by reference. This application claims the benefit of U.S. Provisional Patent Application Ser. No. 61/953,214, filed Mar. 14, 2014, which is incorporated herein by reference.

BACKGROUND OF THE INVENTION

Field of the Invention

The present invention relates generally to a system and method for mounting a sign or display, and in particular to a magnetic or hook display mounting system and method.

Description of the Related Art

Signs and displays are used extensively in stores, theaters, shopping centers, recreational facilities, schools, tradeshows, restaurants, and other public places. Some signs are permanent signs to direct customers and others to locations within the facility, such as to exits or restrooms. However, temporary signs and displays are frequently used to display information to the customers or others, such as to announce a sale or a new product or service, to identifying a location of an item or departments within the facility, or other uses.

The signs or displays are preferably mounted at readily visible locations within the facility. One such visible location is to mount the sign or display suspended from a ceiling. The facility may have a suspended ceiling that includes a metal gridwork or grid structure that supports ceiling tiles. The sign or display may be mounted to the gridwork by an employee, for example, climbing a ladder or stepping onto a box or crate to reach the gridwork so as to affix the sign or display. The risk of falling or other injury is a very real possibility, particularly if the ladder, box or crate is set on a wet or uneven floor, if the employee must reach beyond the safe limit of the ladder, or if other customers or displays are nearby so as to prevent an ideal positioning of the ladder, or simply if the employee is unsteady when climbing the ladder or atop the crate.

A known sign holding and mounting device has been provided that utilizes an elongated pole to position a sign holding and mounting channel or sign holder for attachment to a ceiling grid structure using clamps on the sign holder to engage the grid structure or an elongated flexible magnet affixed to the sign holder for fastening to a ceiling grid. The sign holder channel is held in a gripper on the elongated pole, is clamped or magnetically affixed to the ceiling grid structure using the flexible magnet strip, and is released by the gripper using a rope to open a jaw on the gripper. The gripper can be difficult to open as a result of high spring force on the gripper jaw and the configuration of the gripper. It would be an improvement over the art if the gripper jaw were easier for the user to open, while still retaining the sign holding channel with sufficient holding force.

The gripper mounted on the end of the pole engages the sign holding channel by grasping and engaging a smooth plastic surface on the channel. The known sign holding channel may slip in the gripper as a result of the gripper engaging the smooth plastic surface of the channel, particularly when the channel is being moved about with a sign or display suspended from it. For example, the channel and the sign suspended from it may slip out of the gripper as the sign is being moved to an overhead position at the ceiling or when the channel and sign are being removed from an overhead position at the ceiling. This can result in frustration by the user, damage from the falling sign, and even a risk of injury. It would be an improvement over the art to prevent slipping of the channel in the gripper.

The known sign holding channel holds the sign or display using block-end hooks mounted in the channel. The block-end hooks can slip in the channel, such as during mounting and un-mounting of the sign or display from the overhead position or when the sign is subject to wind or other forces. Slipping of the block-end hooks in the channel may result in the sign or display becoming uneven or may even cause the sign or display to dislodge or fall. It would be an improvement to prevent slipping of the sign or display from the sign mounting channel.

The known sign holding and mounting channel may become dislodged from the ceiling grid as a result of weak magnetic attraction between the ceiling grid and the flexible magnetic strip on the channel. It would be an improvement to provide greater holding strength for the sign mounting channel.

The known sign holding and mounting channel may only be affixed to a ceiling grid of a suspended ceiling. It would be an improvement to permit a sign mounting channel to be affixed to other ceiling types. It would also be an improvement to permit a sign holding channel to be affixed to a wall surface or in a window. It would be a further improvement to provide ease of mounting for small or light weight display elements.

SUMMARY OF THE INVENTION

The present invention, according to certain embodiments, provides a secure and easy-to-use system and method for mounting and un-mounting signs and displays that permit the signs or displays to be mounted on a ceiling, wall, or window frame while the person remains standing on the floor. The system and method may use a pole-mounted gripper to position a sign or display holding and mounting apparatus at a ceiling, wall, or window frame and to remove the sign or display holding and mounting apparatus from the ceiling, wall, or window frame. The gripper is easy to operate to an open position to release the sign or display holding and mounting apparatus at a mounting location and to engage the sign or display holding and mounting apparatus for removal from the mounting location.

The sign or display holding and mounting apparatus may include an elongated channel or holes for holding block-end hooks, hanger clips, or other mounting hardware. The elongated channel of certain embodiments includes grip enhancing portions that are engaged by the pole end gripper to prevent slipping of the elongated channel in the gripper. Slipping of the elongated channel in the pole end gripper is further enhanced by end caps that are mounted on the ends of the elongated channel. The end caps also block the ends of the channel to reduce the chance that a block-end hook or other hardware mounted in the channel will slip from the channel.

The sign or display mounting system includes strong magnets that are provided on the sign or display mounting elements for securely affixing the sign or display to a ceiling or wall or other facility structure. Elongated channels for affixing larger signs are provided with more of the strong magnets, thereby providing greater holding strength, while fewer are required for shorter channels.

The sign and display mounting system and method of certain embodiments includes mounting plates of a ferrous or other magnetic metal that may be affixed to a ceiling to provide a mounting location for magnetically mounting the sign or display. For example, the mounting plate may be affixed to a drywall ceiling using drywall screws or toggle bolts. A single mounting plate may be provided or a plurality of the mounting plates may be provided, for example, in a line, to provide a mounting location for a longer sign or display holding and mounting channel.

The mounting plates may be mounted to a wall for magnetically affixing a sign, poster, or other display to the wall. The elongated holding and mounting channel may be configured for affixing the sign or display to the wall. In certain embodiments, an elongated right angle bracket or channel is provided that provides the sign or display suspending portions separated horizontally from the gripper engaging portion. In certain embodiments, the sign or display suspending portions include friction fit or other sign gripper portions that directly engage the sign or display. The gripper engaging portion of the right angle bracket or channel may be engaged by the pole end gripper for placement at a wall mounting location without the pole end gripper interfering with the sign or display suspended in the sign engaging portion. The sign or display is directly engaged in the right angle bracket rather than requiring hooks or other hardware for mounting.

The right angle bracket or channel may have magnets mounted on the wall-facing surface for wall mounting, or may have the magnets mounted on a top surface for mounting on a ceiling or within a window recess, for example. If mounted at a window, certain embodiments of the system and method provide a ferrous or other magnetic metal strip for mounting above the window to which the magnets of the right angle bracket are affixed.

The elongated channel may be mounted to an exposed girder ceiling, an open grid ceiling, or other structure using hooks mounted on the elongated channel instead of the magnets. The elongated channel is moved into position for hooking the hooks onto one or more of the exposed girders by gripping the elongated channel using the pole end gripper, and may be removed using the pole end gripper as well. The elongated channel may include a pivot to permit pivoting movement between an upper portion and a lower portion of the elongated channel. The elongated channel may thereby be rotated to a convenient viewing angle even if the ceiling grid or other structure from which the display is suspended is not at the desired angle.

In certain embodiments, a magnetically mounted hanger member is provided for affixing to a ceiling grid, mounting plate, or other metal surface using the pole end gripper. The hanger member may include a string or line affixed to the hanger member from which a display element may be suspended. In addition to or in place of the string or line, hooks or other display hanging members may be provided to connect a sign or display to the magnetically mounted hanger member.

DETAILED DESCRIPTION OF THE PREFERRED EMBODIMENTS

Figure 1:
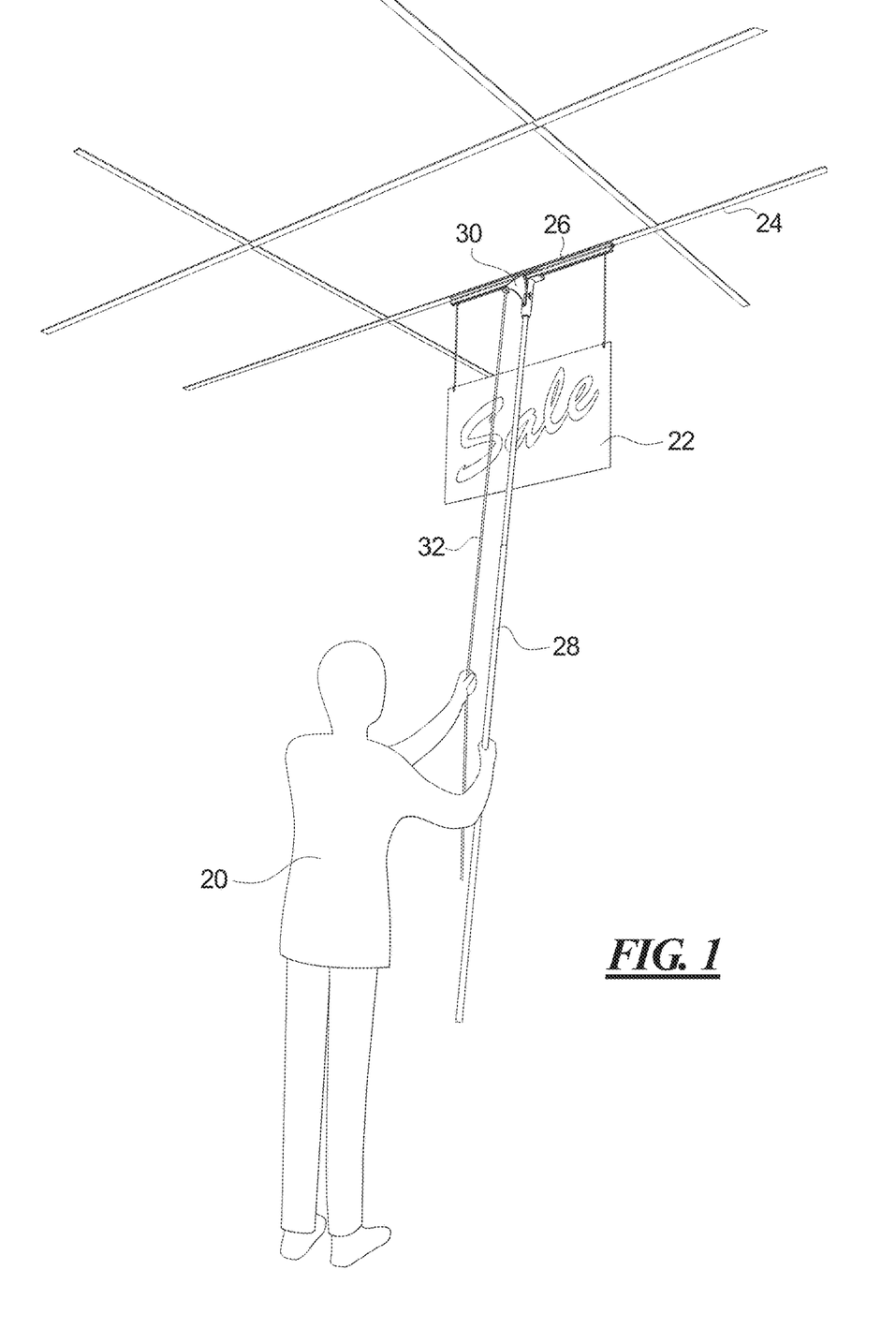
FIG. 1 is a schematic representation of a person affixing a sign to or removing a sign from a ceiling grid using an elongated pole of a ladderless display mounting system according to the principles of the present invention.

FIG. 1 shows a person 20 affixing a sign or other display 22 to a ceiling grid 24. The sign 22 is suspended from a holding and mounting channel 26 that may be affixed to metallic members of the ceiling grid 24 by magnets. The person 20 uses a pole 28 to position the channel 26 so that the channel 26 may magnetically engage the metallic members of the ceiling grid 24. The channel 26 is held at the end of the pole 28 by a pole end gripper 30. The person 20 may release the channel 26 from the pole end gripper 30 by pulling on a rope or cord 32 to release the channel 26 from the pole end gripper 30 and thereby leave the channel 26 affixed to the ceiling grid 24.

When the person 20 desires to take the sign or display 20 down from the ceiling, the person uses the pole 28 to position the pole end gripper 30 at the channel 26, operates the rope or cord 32 to engage the channel 26 with the pole end gripper 30, and moves the pole 28 away from the ceiling to thereby remove the channel 26 from the ceiling grid 24.

The person 20 is able to install and remove signs and displays without the use of a ladder, step-stool, bench, chair, crate, or other support for the person 20 to stand on while installing and removing the sign or display 22.

FIG. 1 shows the person 20 holding the pole 28 in position with one hand while operating the rope or cord 32 with the other hand. The person may use both hands on the pole 28 to move the sign to the display position or away from the display position. The person may use one of their hands to pull on the rope or cord 32 when disengaging or engaging the channel 26 from the pole end gripper 30, or may have an assistant help. The pole end gripper 30 is structured to provide a secure engagement of the channel 26 when desired and to release the channel 26 from the gripper 30 with a reduced pulling force. As will be apparent from the following, the channel 26 includes features to avoid the channel slipping from the gripper 30.

Figure 2:
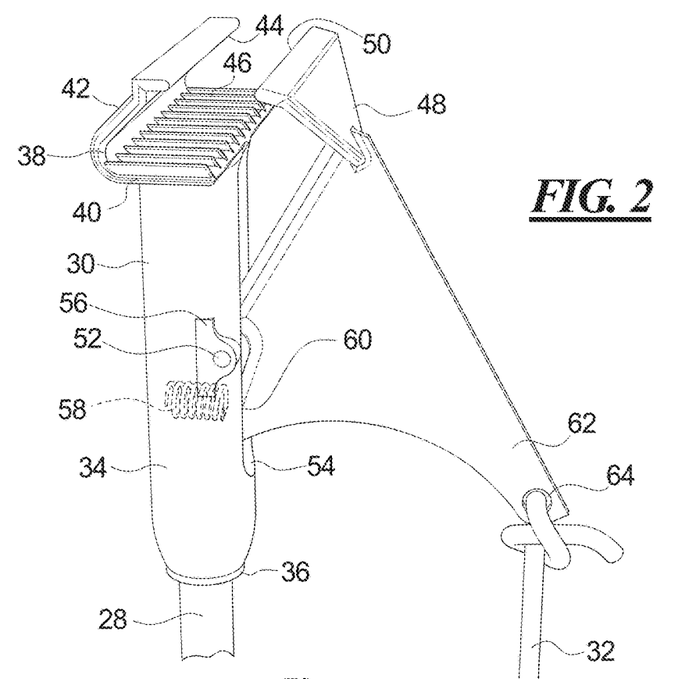
FIG. 2 is a side perspective view of a pole end gripper on the elongated pole, the gripper being shown in an open position.

Turning to FIG. 2, the pole end gripper 30 has a barrel 34 that is affixed to the end of the pole 28, such as by being threaded onto the end of the pole at a threaded opening 36 at one end of the barrel 34. The other end of the barrel 34 includes a first portion 38 of a gripping jaw that has a transverse portion 40 at the end of the barrel 34 and a jaw 42 extending from one side of the transverse portion 40 and curving endwardly to a first jaw edge 44. The transverse portion 40 of the illustrated embodiment includes a plurality of parallel ribs 46, although other structures are possible as well.

A second jaw 48 includes a second jaw edge 50 that is movable toward and away from the first jaw edge 44. The second jaw 48 is mounted on a pivot pin 52 that is secured in the barrel 34 and fastens the second jaw 48 in a slot 54 in the barrel 34. The pivot pin 52 is held in shaped projections 56 on the barrel 34. A spring 58, shown in phantom, is mounted in the barrel 34 and bears against a portion 60 of the second jaw 48 to urge the second jaw edge 50 toward the first jaw edge 44. A projection 62 of the second jaw 48 extends outward away from the barrel 34 to provide an elongated lever arm. The projection 62 includes an opening 64 at which the rope or cord 32 is affixed, such as by being knotted or formed into a loop. Pulling on the rope or cord 32 overcomes the spring force to open the jaws for engaging and releasing a channel or mounting member. The elongated lever arm of the projection reduces the amount of force that must be exerted by pulling on the rope 32 to overcome the spring force. Use of a strong spring 58 to securely engage the display mounting channel is possible, while still permitting the jaw to open with relatively little pulling force.

Figure 3:
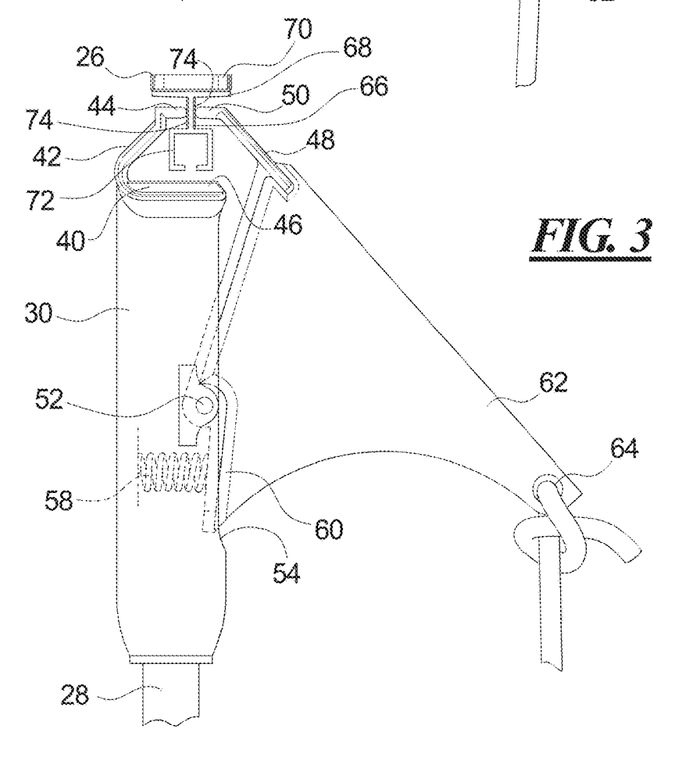
FIG. 3 is a side elevational view of the pole end gripper engaged with a sign or display holding and mounting channel of the ladderless display mounting system.

With reference to FIG. 3, the pole end gripper 30 is affixed to the elongated sign or display holding and mounting channel 26 by the first and second jaw edges 44 and 50 engaging opposite sides of a neck 66 of the channel 26. The neck 66 extends between a magnet mounting plate 68 to which is affixed a magnet 70 and an open channel portion 72. The magnet 70 may be affixed to the magnet mounting plate 68 by glue, double-sided tape, screws, rivets, or other fastening means. The first and second jaw edges 44 and 50 are shaped to extend between the magnet mounting plate and the open channel portion 72 by extending around the open channel portion 72. The ribs 46 on the transverse portion 40 prevent the jaw edges 44 and 50 from engaging around the magnet mounting plate 68 by bearing against the channel portion 72 when the pole end gripper 30 is pressed against the channel 26. The ribs 46 thereby prevent the channel 26 from being too deeply engaged by the pole end gripper 30. In place of the ribs 46, other shapes or structures may be provided to offer this advantage.

The holding and mounting channel 26 of certain embodiments is formed of an extruded plastic material which may be slippery, and as such may slip when gripped by the pole end gripper 30. In preferred embodiments, a soft, non-slippery material is provided on the neck 66 of the channel 26. In the illustrated example, two strips 74 of flexible polyvinyl chloride (FPVC) are provided on the neck 66. The strips 74 may be soft and tacky so as to provide a high coefficient of friction between the channel 26 and the jaw edges 44 and 50. The strips 74 prevent the channel 26 from slipping when engaged by the pole end gripper 30. The strips 74 of certain embodiments are sufficiently grippy (having a high coefficient of friction when engaged by the gripper 30) to prevent slipping of the channel 26 even when a heavy sign or display is suspended in the channel 26 and while the channel 26 and sign are being lifted overhead for mounting on the ceiling or for dismounting from the ceiling. The present system and method enables a safer mounting of the sign or display, with less chance of the channel slipping from the gripper.

The strips 74 may be adhered to the channel 26 in an assembly step or in a preferred embodiment are co-extruded with the channel 26 so as to be formed bonded together with the material of the channel. The high friction strips 74 may be used in many of the embodiments of sign and display mounts or holders of the present system, including the sign and display mounting channels shown herein.

Figures 4, 5:
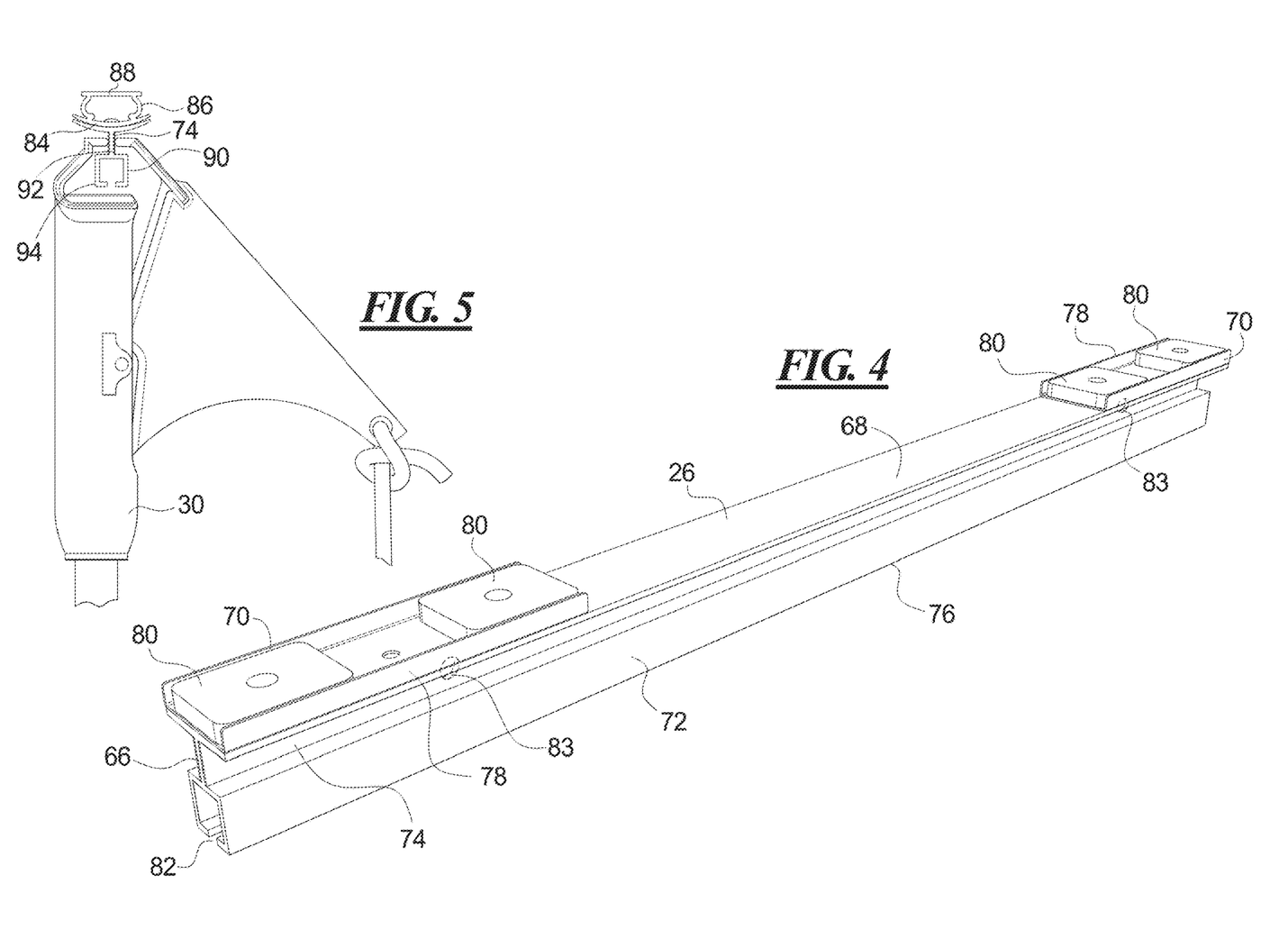
FIG. 4 is a perspective view of the sign or display holding and mounting channel of FIG. 3.
FIG. 5 is a side elevational view of a rotatable sign or display holding and mounting channel of the ladderless display mounting system.

Turning to FIG. 4, the sign or display holding and mounting channel 26 includes an elongated body 76 that may be formed by an extrusion of a plastic or metal material. The elongated body 76 has the magnet mounting plate 68 forming a top, generally planar surface to which is mounted the magnets 70. The magnets 70 of the illustrated example are channel magnets, each of which includes a channel 78 of steel or other ferrous metal. Within the channel 78 are two ceramic magnets 80. The combination of the metal channel 78 and the ceramic magnets 80 provide high magnetic strength for securing the channel 26 to a ferrous or other magnetic metal mounting location, such as a ceiling grid element. The channel magnets holds the channel 26 and any signs or displays mounted thereon more securely than a flexible magnetic strip affixed to the elongated body 76.

Two of the channel magnets are provided on the elongated body 76. More magnets may be provided as desired. The elongated body 76 may be provided in a variety of lengths for holding signs or displays of different sizes. More channel magnets 70 are mounted on the elongated body 76 of the longer channels and fewer on the shorter channels.

As described with reference to FIG. 3, the elongated body 76 of FIG. 4 has the neck 66 on which the strips 74 of high friction material are affixed. The neck 66 may also include holes 83 by which hooks, wire, string, cord, or other display affixing means may be affixed to the elongated body 76. Two holes 83 are shown, although other numbers of holes may be provided. The channel 26 has the open channel portion 72 into which may be inserted sign and display hanging and mounting elements. The open channel portion 72 defines an open slot 82 at the bottom of the channel portion 72.

The channel 26 of FIG. 4 may be mounted in alignment with members of the ceiling grid 24. It is desirable in some sign and display installations to permit pivoting of a sign or display to a better viewing angle. As shown in FIG. 5, the pole end gripper 30 is engaged on a pivotable sign or display holding and mounting channel 84. The pivotable channel 84 has a fixed portion 86 that has a magnet mounting surface 88 to which the channel magnets 78 are affixed. A rotatable portion 90 is pivotably affixed to the fixed portion 86 and may rotate at any angle or may remain aligned with the fixed portion. The rotatable portion includes a neck 92 at which is applied the high friction strips 74 for engagement by the pole end gripper 30 as shown. The rotatable portion also includes an open channel portion 94 in which sign and display mounting elements may be disposed. FIG. 5 shows that the same pole end gripper 30 may be used to mount the pivotable channel 84 as is used to mount the non-pivotable channel 26.

Figures 6, 7:
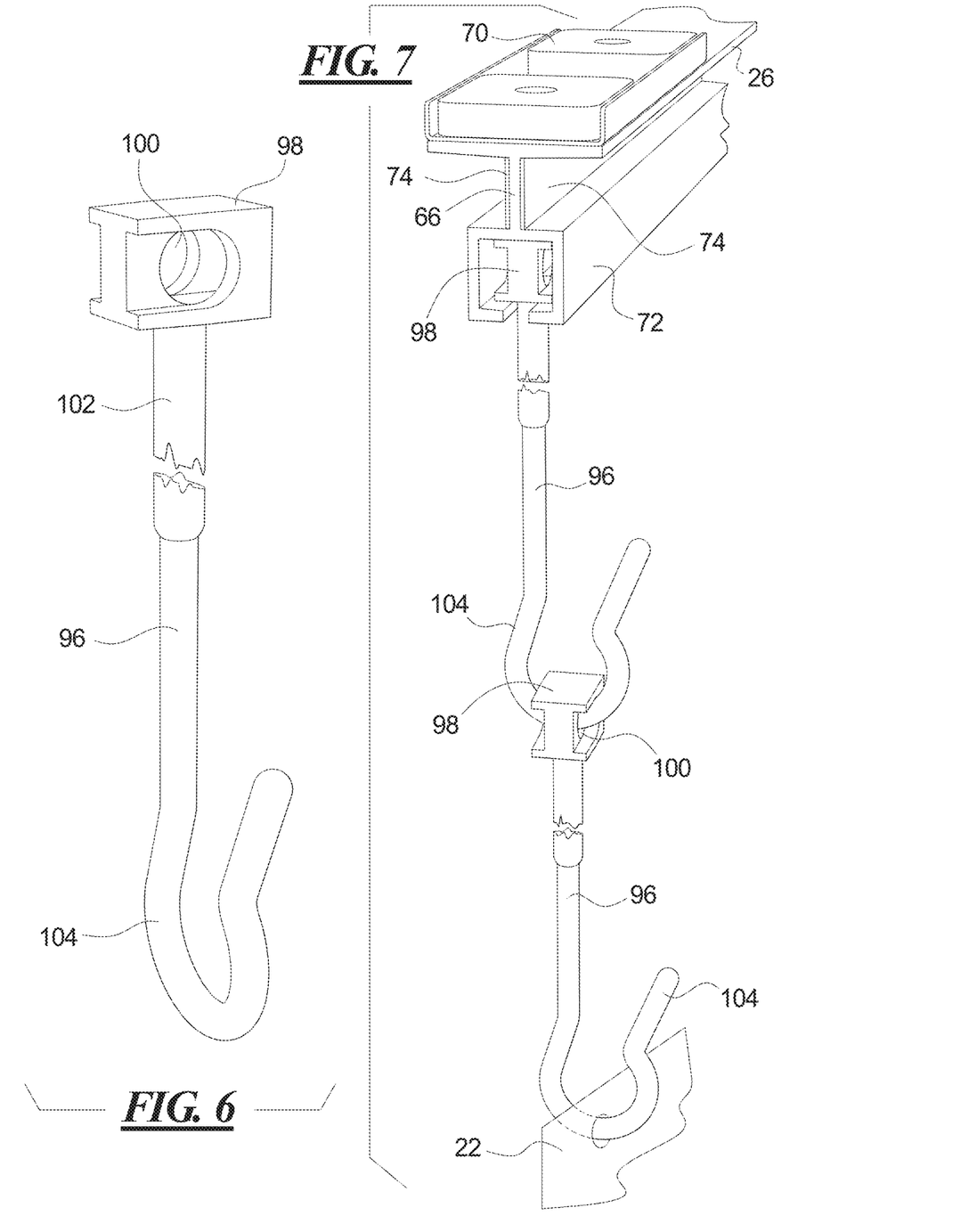
FIG. 6 is an enlarged perspective view of a display hanging hook, in broken view, for use with the sign or display holding and mounting channel.
FIG. 7 is an enlarged perspective view of a sign or display holding and mounting channel and two display hanging hooks, in broken view.

FIG. 6 shows a block-end hook 96 that may be used in the holding and mounting channel 26 or the pivotable channel 84, for example. The hook 96 includes a block end 98 that fits into the open channel portion 72 or 94. The block end 98 includes an opening 100. An elongated shaft 102 extends from the block end 98 to a hook 104. The hook 104 may be used to hold a sign or display, for example. Although the hook 104 is of a particular shape in the illustration, other hook shapes or other sign or display engaging and/or support members may be provided with a block end as well. The elongated shaft 102 may be of any length.

FIG. 7 shows the holding and mounting channel 26 on which is provided the magnet 70 for magnetically engaging a ceiling grid, for example. The channel 26 has the high friction strips 74 on opposite sides of the neck 66 for gripping by the pole end gripper 30. The open channel portion 72 has mounted therein the block-end hook 96. The block end 98 is inserted into the open channel portion 72 and is slid along the channel to any desired position. A single block-end hook 96 may be positioned in the channel 26 to hold the sign or display, but more typically two of the block-end hooks 96 are provided, usually positioned near the opposite ends of the channel 26 to support opposing corners of the display or sign 22. Of course, more of the hooks may be provided as needed, for example, to support a middle of the sign or display.

The block-end hooks 96 are provided in different lengths so that it is possible to hang the sign or display 22 lower or higher as desired. If the user wishes to hang the sign or display 22 lower from the ceiling than is possible with the longest hooks available, the block-end hooks 96 may be linked to one another to provide a sign support of greater length. In FIG. 7, a second block-end hook 96 is hooked onto the first block-end hook 96 by passing the hook portion 104 of the upper block-end hook 96 through the hole 100 in the block end 98 of the lower block-end hook 96. As many hooks as needed may be connected together.

Other mounting mechanisms may be provided as well, including a plastic or metal hanger clip that fastens into the open channel member 72. The hanger clip includes an opening that permits S-hooks, rings, wires, cables, cord, or other fasteners or hangers to be affixed to the channel 26 for suspending a sign or display 22. In some embodiments, the channel 26 includes one or more holes formed in the channel at which S-hooks, rings, wires, cables, cord, or other fasteners or hangers may be affixed. In an exemplary embodiment, two such holes are provided, in the channel 26, one adjacent each end of the channel 26 and passing through the neck 66. It is envisioned that slots, or other holes, may be provided in any number in the channel 26 to facilitate hanging of signs and displays.

Figure 8:
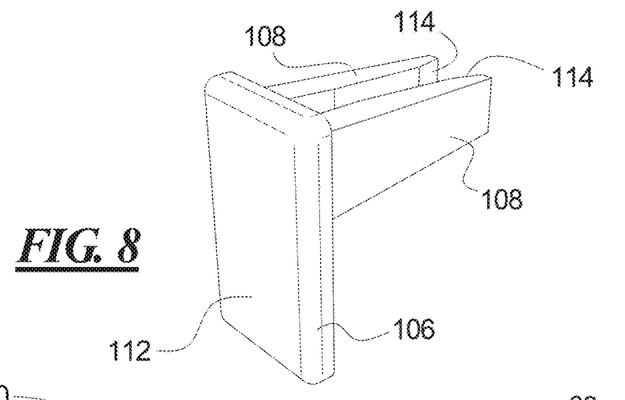
FIG. 8 is a perspective view of an end cap retainer.

The block-end hook 96 or other device positioned in the open channel portion 72 may fit snuggly so as to remain in position while the channel 26 is being affixed to the ceiling. However, the mass of the sign or display 22 coupled with the movement of the assembled sign and block-end hooks and the channel as it is being moved to the display position at the ceiling may cause the block-end hooks or other elements to slide out of the open channel portion 72. An end cap retainer 106 as shown in FIG. 8 is provided to retain the sign mounting elements in the channel 26. The end cap retainer 106 includes first and second fingers 108 that extend generally parallel to one to form a gap 110 therebetween. The fingers 108 project from an end plate 112. The end plate 112 may be shaped or colored to be decorative. The free ends of the fingers 108 are beveled at 114 to form a wider gap at the ends of the fingers.

Figures 9, 10:
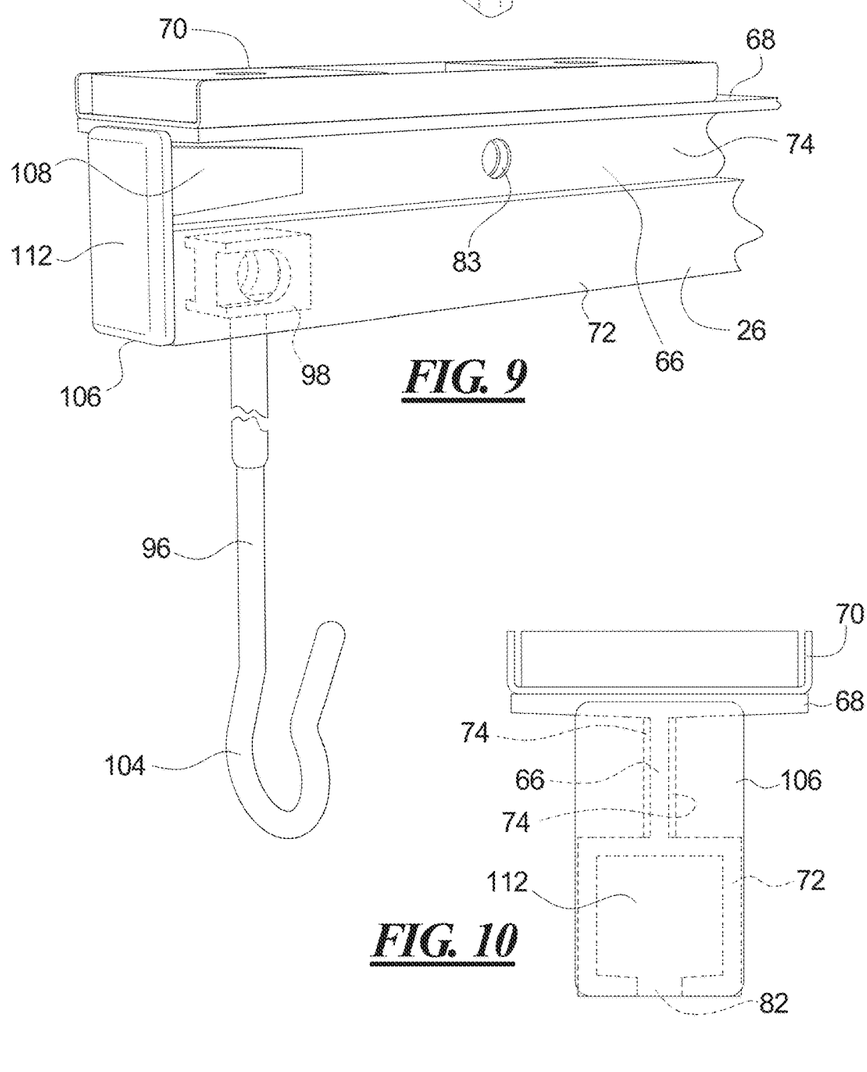
FIG. 9 is a perspective view of the end cap retainer of FIG. 8 shown affixed to the sign or display holding or mounting channel of FIG. 4 and including the display hanging hook of FIG. 6.
FIG. 10 is an end view of the end cap retainer on the sign or display holding and mounting channel.

FIG. 9 shows the end cap retainer 106 mounted on the sign or display holding and mounting channel 26. The fingers 108 are positioned with the beveled ends 114 of the fingers 108 on either side of the neck 66. The end cap retainer 106 is pressed onto the channel 26 so that the fingers 108 engage the high friction strips 74 on the neck 66. The friction from the strips 74 hold the end cap retainer 106 securely in place so that the end cap retainer 106 does not readily come off the channel 26. If the channel 26 is fastened in the pole end gripper 30, the end cap retainer 106 also blocks the pole end gripper 30 from slipping off the channel 26.

The end cap retainer 106 has the end plate 112 extending to the open channel portion 72 to block access, but more importantly to block egress from the open channel portion 72 by block-end hook 96 or other element in the open channel portion. If the block-end hook 96 slips along the channel 26, such as during installation or removal of a sign or display 22, the end cap retainer 106 prevents the hook 96 from falling out of the channel 26. In the illustration of FIG. 9, the block-end hook 96 is in the channel 26 and is being secured against falling out by the end cap retainer 106. The hole 83 is provided in the neck 66.

Referring now to FIG. 10, the end cap retainer 106 is configured to provide a decorative end cover for the channel 26. In the illustrated embodiment, the end plate 112 closes the open end of the open channel portion 72 and covers the gap between the open channel portion 72 and the magnet mounting plate 68 at the neck 66. The flexible, high friction strips 74 are apparent on opposite sides of the neck 66.

Figure 11:
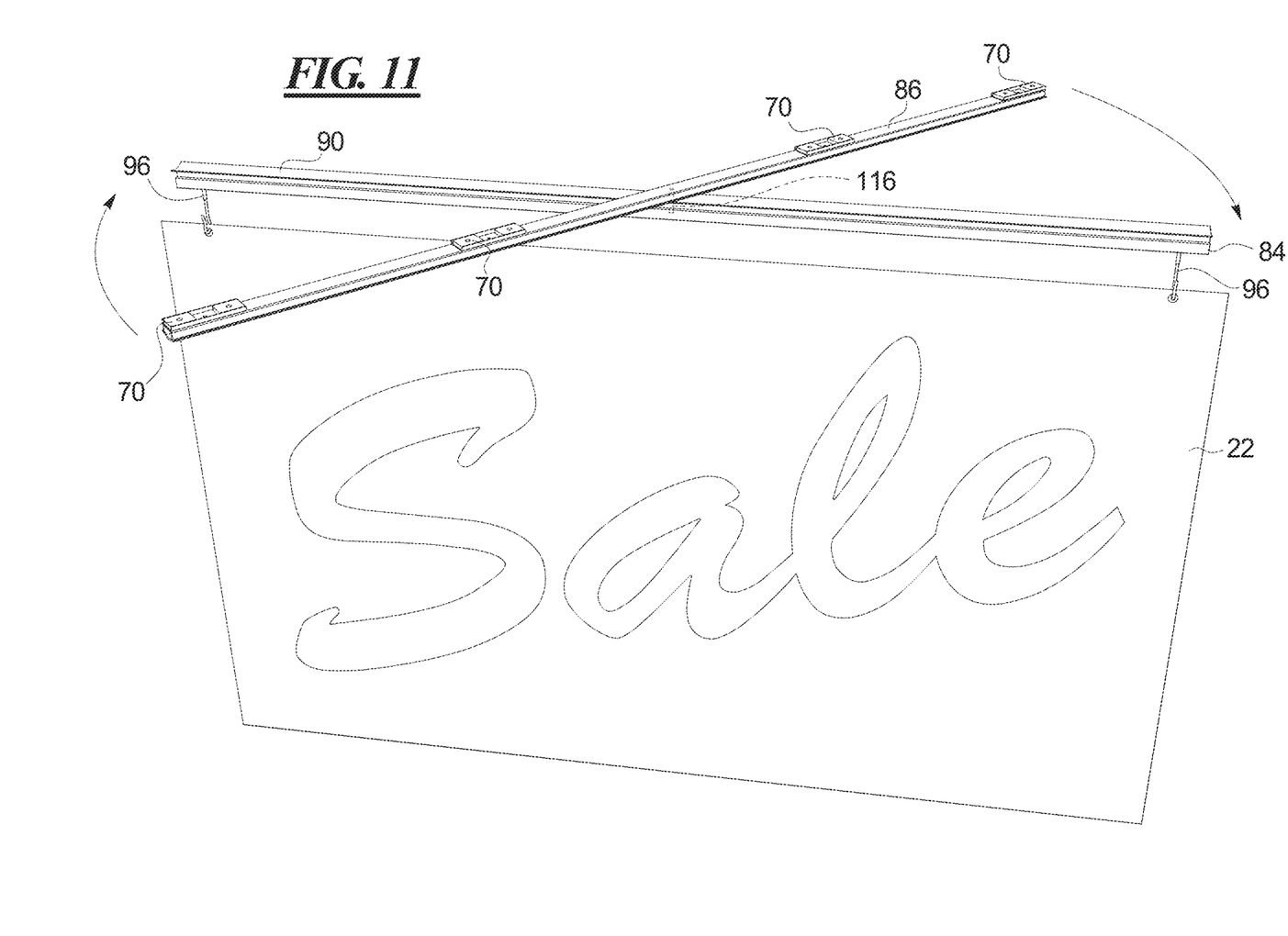
FIG. 11 is a perspective view of the rotatable sign or display holding and mounting channel of FIG. 5 shown holding a sign.

Turning to FIG. 11, the pivotable holding and mounting channel 84 of FIG. 5 is shown with the fixed upper portion 86 rotated relative to the rotatable lower portion 90. The upper portion 86 includes five of the magnets 70 positioned at generally even spacing along its length. The longer channels generally have more magnets 70 than the shorter channels to provide greater holding strength for the heavier displays and signs 22 they are likely to hold. Of course, more or fewer magnets may be provided, or magnets of other configurations may be provided. In the illustrated example, the ceramic channel magnets provide high magnetic holding strength. In other embodiments of the pivotable channel and in other embodiments of the non-pivotable channel 26, for example as shown in FIG. 4, a single strip magnet may be provided in place of the separate magnets, or another magnet configuration or mounting apparatus may be provided.

The pivotable channel 84 rotates about a rivet 116 that connects the fixed portion 86 to the rotatable portion 90. The curved surfaces between the fixed portion 86 and the rotatable portion 90 flex relative to one another to retain the rotational position of the two parts relative to one another. For example, a user may affix the pivotable channel 84 and a sign 22 suspended therefrom to a ceiling grid, and then use the pole 28 to rotate the rotatable portion 90 and the sign 22 suspended from the rotatable portion to any desired angle, for example 30 degrees from the fixed portion 86. The fixed portion 86 remains in position affixed to the ceiling grid and the rotatable portion 90 is pivotated to provide a desired viewing angle for the sign 22. After being moved into the rotated position, the rotatable portion 90 remains at the rotated position. The rotatable portion 90 and the sign 22 may be moved to other positions as desired.

Figures 12, 13:
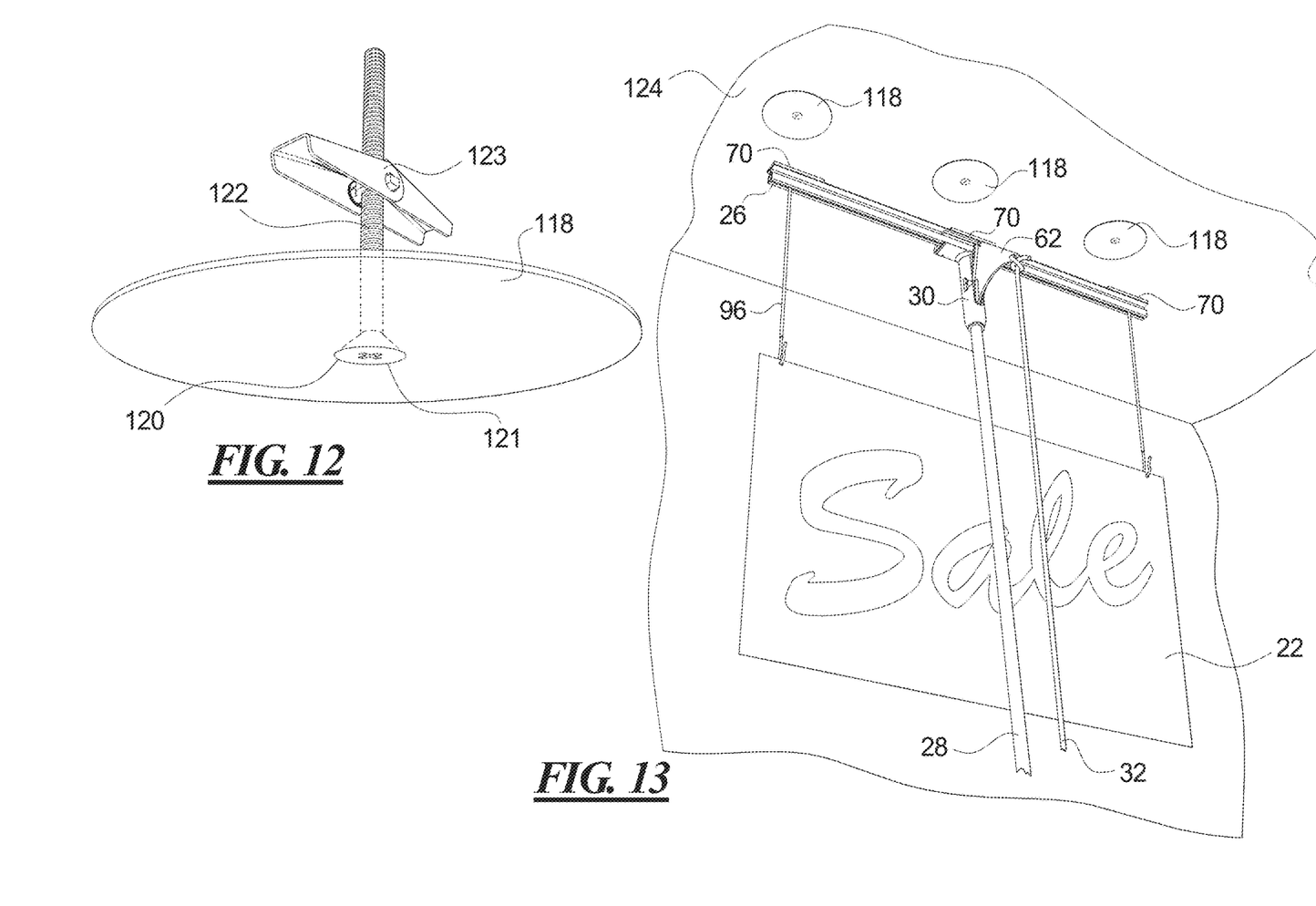
FIG. 12 is a perspective view of a mounting plate for magnetic mounting of a sign or display holding and mounting channel.
FIG. 13 is a perspective view of three of the mounting plates of FIG. 12 mounted in a ceiling, toward which is being moved a magnetic sign or display holding and mounting channel similar to FIG. 4 for mounting on the mounting plates.

In FIG. 12 is shown a mounting plate 118 for mounting magnetically mounted sign or display holding and mounting channels 26, for example. The mounting plate 118 is formed of a ferrous metal, such as steel or other magnetic material, and is of a thickness and size to magnetically engage the magnets of a sign or display supporting channel. In certain embodiments, the mounting plate 118 is a circular steel plate having a central hole 120. An anchor screw 122 is inserted into the central hole 120 to hold the mounting plate 118 to a surface. In the illustrated embodiment, the anchor screw 122 is a toggle anchor for use with hollow walls or ceilings, having an expandable toggle portion 123 capable of fitting through an opening in the wall or ceiling and operable to expand once through the hole. In another embodiment, a Zip-ALL® anchor screw may be used with hollow walls or ceilings, such as drywall board walls and ceilings. The central opening 120 of the mounting plate 118 is of a size to permit the head 121 of the anchor screw 122 to be generally flush with the surface of the mounting plate 118 when the mounting plate is affixed to a ceiling or wall.

The mounting plate 118 is affixed to a ceiling or wall of a facility, such as to a drywall ceiling of a store or business. It some embodiments, it is desired that the mounting plate 118 is unobtrusive when mounted on the ceiling or wall, and so it is painted to match the color to the ceiling or wall. For example, the mounting plate 118 of certain embodiments is white and the head of the anchor screw is white as well. Of course, other colors, including contrasting colors, are possible. The mounting plate 118 is circular in shape in the illustrated embodiment. Other shapes are possible, including square, oval, rectangular or any other shape. The mounting plate may also be a strip or other shape having multiple holes for accepting multiple anchors. The mounting plate 118 of certain embodiments is of a thickness that holds securely to the magnets but also has a low enough holding force to release the magnet from the mounting plate 118 without dislodging the mounting plate 118 from the ceiling or wall.

The anchor screw 122 is one example of an anchor that may be used to hold the mounting plate in place. Another anchor that may be used is a so-called toggle anchor that includes a portion of the anchor which expands behind or inside the hollow wall or ceiling. Any anchor, screw, fastener, or fixing means may be used, including adhesives or the like.

With reference to FIG. 13, the mounting plate 118 of FIG. 12 has been affixed to a ceiling 124 with two additional mounting plates 118. The mounting plates 118 are provided generally in a line at a location where a sign or display 22 is to be suspended. The mounting plates 118 are spaced from one another approximately at the spacing of the magnets 70 on the channel 26. In one example, the mounting plates 118 are mounted with a center-to-center spacing of approximately 11 inches. Other spacings are of course possible.

The channel 26 that is shown just prior to being mounted on the mounting plates 118 has three of the magnets 70 which will affix the sign or display 22 to the arrangement of three mounting plates 118. It is not necessary that the number of mounting plates 118 match the number of magnets on the channel. For instance, a shorter channel having two magnets could be mounted on the illustrated line of three mounting plates. A fourth mounting plate could be added to the line of mounting plates, which could accommodate a longer channel having four magnets, or shorter channels with two or three magnets. It is not necessary for every magnet on the channel to affix to a corresponding mounting plate. The channels could have more magnets than the number of mounting plates to which it is affixed.

FIG. 13 shows the pole end gripper 30 moving the holding and mounting channel 26 into position while the person stands on the floor and need not climb on a ladder or crate to affix the sign 22 to the ceiling. The projection 60 on the pole end gripper 30 enable the person to release the channel 26 with less pulling effort on the rope or cord 32. The channel 26 includes the strips 74, such as are shown in FIG. 7, to prevent the channel and sign from slipping from the gripper 30 while overhead, both during installation and during removal.

Figure 14:
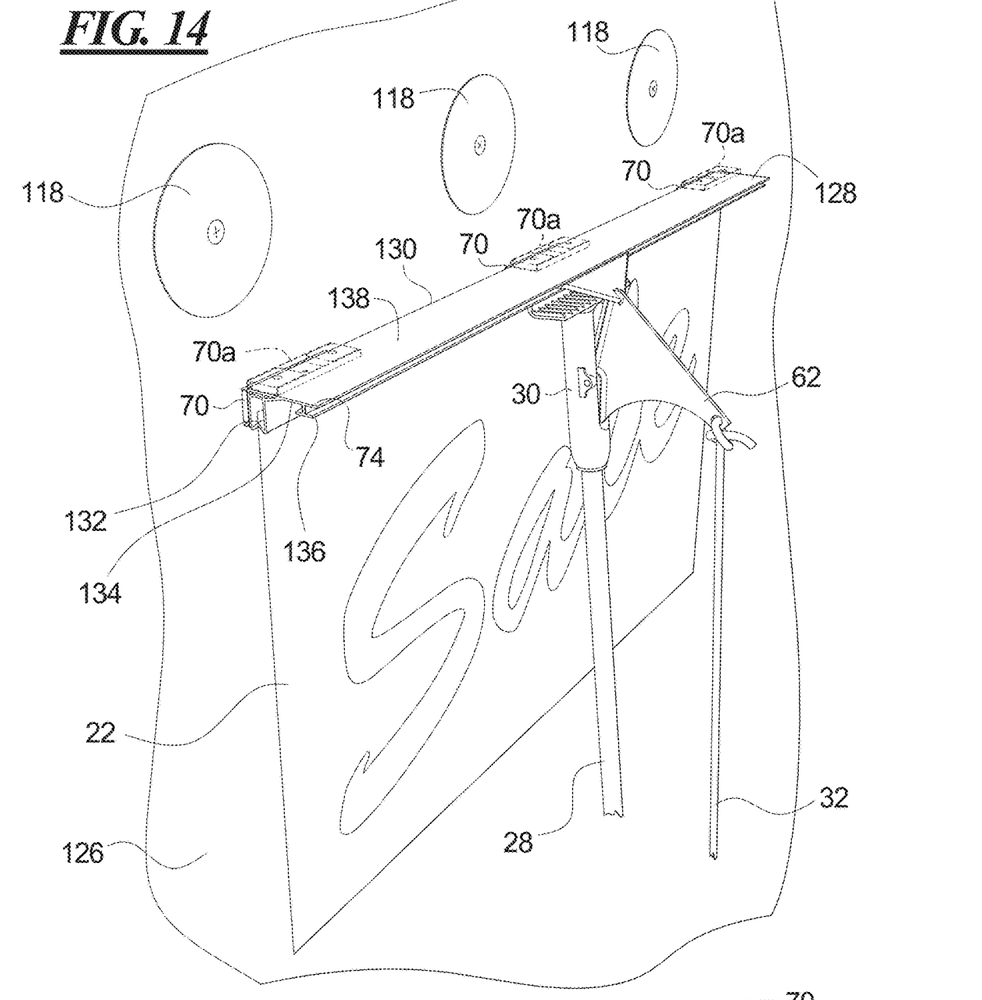
FIG. 14 is a perspective view of three of the mounting plates of FIG. 12 mounted on a wall, toward which is being moved a magnetic wall bracket of the ladderless display mounting system.

FIG. 14 shows the mounting plates 118 mounted in a line to a wall 126. A sign or display may be magnetically mounted to the wall 126 using a magnetic mounting channel. To facilitate mounting of a sign or display on a wall while permitting use of the pole 28 and pole end gripper 30 for placement and removal of the sign or display, a wall hanger channel 128 includes a wall facing magnet mounting surface 130 to which is attached the magnets 70. The wall hanger channel 128 has a display gripping portion 132 that directly engages a sign or display 22. For example, the display gripping portion 132 may be a friction fit gripping portion having two inwardly and upwardly directed wall members between which is inserted the display or sign 22 for engagement with the display or sign 22. Other embodiments include display or sign grippers having a plurality of inwardly directed fingers that engage the display or sign when the display or sign is inserted into the gripper. Hinged grippers are also possible, as are other grippers or holders for a display or sign.

The display gripping portion 132 that engages the display or sign directly mounts the display or sign with the wall hanger channel 128 affixed directly to the top of the display or sign. The mounting of the sign or display directly to the channel would prevent use of the pole end gripper 30 to mount the channel if a channel similar to FIG. 4 were provided. For this reason, the wall hanger channel 128 includes a perpendicularly projecting portion 134 that extends outward from the display gripping portion in a direction generally perpendicular to the magnet mounting surface 130. The perpendicularly projecting portion 134 includes downwardly projecting T-shaped portion 136 that may be grasped by the pole end gripper 30, as shown. The T-shaped portion 136 has a neck with the flexible high friction strips 74 that are engaged by the first and second jaw edges 44 and 50 of the pole end gripper 30 to avoid slipping of the wall hanger channel 128 in the gripper 30. The T-shaped portion 136 is but one configuration for engagement by the pole end gripper 30. Other configurations of gripping portions are also possible.

The offset positioning of the portion 136 for gripping by the pole end gripper 30 from the display or sign engaging portion 132 may be used in other embodiments of sign and display suspending or holding devices. By utilizing the offset positioning, the pole end gripper need not grasp directly onto the open channel portion that holds the sign or display, providing flexibility in the mounting of the display or sign to the channel and flexibility as to whether a gap is desired between the channel and the top of the display or sign.

It is also possible that a channel, such as the open channel portion described herein, may be provided on the wall hanging channel in place of the display gripping portion 132.

The display or sign may be suspended below the channel on block-end hooks or other suspension means.

The wall hanger channel 128 may be used for mounting posters to a wall 126, for example, since the poster would be less likely to curl or to move in the breeze when mounted flush against a wall surface. Other signs or displays may be mounted on the wall as well.

The same wall hanger channel 128 may be provided with magnets 70a along a top surface 138, for example, the top surface formed by the horizontal extension from the display gripping portion 132 and the downwardly projecting T-shaped portion. When the magnets 70a are provided on the top surface, as shown in broken outline, the wall hanger channel 128 may be affixed to a ceiling, such as to a ceiling grid 24 as shown in FIG. 1, to a frame member at a perimeter of the ceiling grid, or to a line of mounting plates 118 on the ceiling 124 as shown in FIG. 13. When so mounted, the sign or display 22 extends up to the ceiling instead of being spaced from the ceiling by a gap as a result of hanging hardware, for example, the block-end hooks 96. The magnets may be mounted on either the side as shown at 70 or on the top as shown at 70a, or both.

When the magnets 70a are mounted at the top of the wall hanger channel 128, the channel 128 may be used to affix a display or sign in a window by magnetically attaching the magnets 70a to the upper part of the window frame. If the window frame lacks a ferrous metal or other material that will hold the magnets 70a, the window frame may be modified by fastening a steel or other ferrous metal strip to the upper portion of the window frame. The steel or other metal strip serves as a mounting location for the magnets 70a of the wall hanger channel 128. In certain embodiments, the steel strip is approximately 25 mm wide, has a length corresponding to the width of the window frame or at least to the width of the display or sign, and is held in place by double-stick tape or other fastening means.

Mounting of displays or signs in a window is not limited to the wall hanger channel 128. For example, a channel 26 that utilizes hanging hardware such as the block-end hooks 96, may also be used to mount a sign or display in a window. It may be necessary to mount the ferrous metal strip in the window frame for this application as well.

Figure 15:
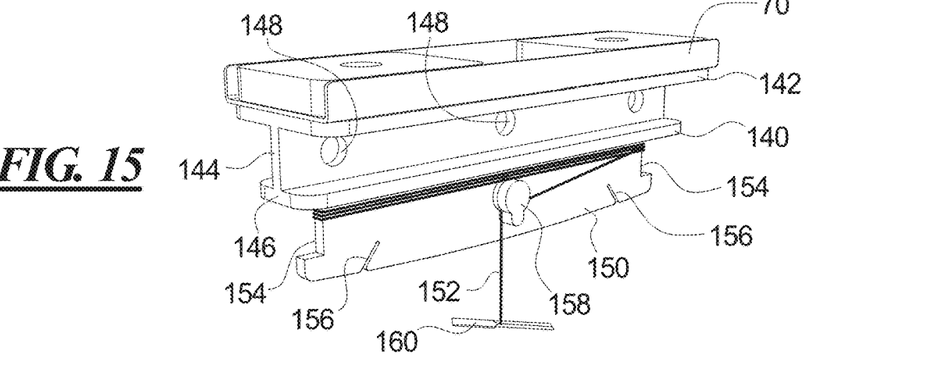
FIG. 15 is a perspective view of a magnetically mounted dangler sign or display holding and mounting channel of the ladderless display mounting system.

FIG. 15 shows a multi-use hanger clip, or sign or display holding and mounting channel, 140 that may be used to suspend a variety of displays or other items from a ceiling or other surface. The hanger clip 140 has a magnet 70 affixed to a magnet mounting portion 142. A neck 144 extends from the magnet mounting portion 142 to a T-shaped portion 146. The pole end gripper 30 may grasp around the T-shaped portion 146 to engage the neck 144 for holding the hanger clip 140 for placement and removal at a display location. The small and light hanger clip may not need the high friction strips on the neck.

The neck 144 includes several holes 148 into which may be connected S-hooks, sign hanging rings, wires, cables, cord, string, or other mounting means for suspending a sign or display from the clip 140. Below the T-shaped portion 146 is provided a string winding portion 150 on which may be wound a string or line, such as the string 152. The string winding portion 150 has notches 154 to hold the string 152 when wound thereon. Slots 156 are provided into which a free end of the string 152 may be engaged to secure the end during storage or further use of the hanger clip 140. A string catch 158 extends from the side of the string winding portion 150. The string catch 158 defines a space between the winding portion 150 and the catch for securing a portion of the string 152 so that the free end of the string 152 hangs below a center of the hanger clip 140. The string 152 may have a barb 160 on the end for affixing a display element.

A length of the string or line 152 may be unwound from the winding portion 150 so that the desired length of string extends from the hanging clip 140. The string is engaged in the string catch 158 and the display element fastened to the free end of the string, such as by being connected to the barb or by tying the string to the display element or otherwise. The hanger clip 140 may thereby be positioned at the desired display location with the display element dangling beneath the hanger clip 140 on the string 152. Small displays, such as tags, greeting cards, postcards, mobiles, or other displays may be mounted on a ceiling for dangling display without the use of a ladder, using the pole end gripper 30 to affix and remove the hanger clip 140.

Figure 16:
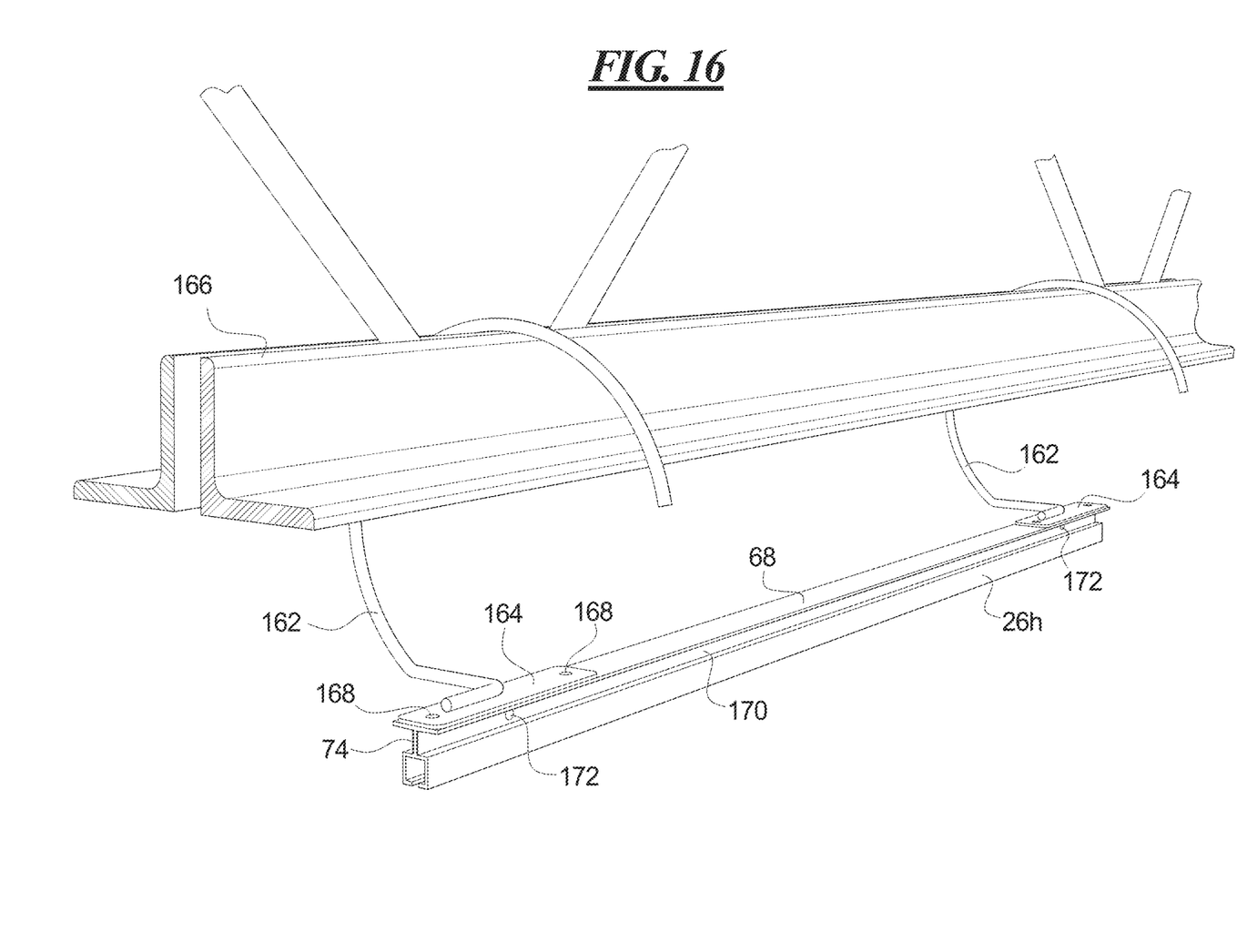
FIG. 16 is a perspective view of a hook mounted ladderless sign or display holding and mounting channel of the ladderless display mounting system.

Turning to FIG. 16, a sign or display holding and mounting channel 26h is provided with first and second hooks 162 that are affixed to the mounting plate 68 of the channel 26h. The mounting plate 68 may be generally the same as the magnet mounting plate 68 for embodiments that utilize the magnets instead of hooks. Each hook 162 includes a foot plate 164 that is fastened to the channel 26h. The foot plate 164 may have holes 168 in it for mounting to the channel using screws or other fastening means. In certain embodiments, the hooks are glued or taped, for example using double stick tape, to the channel 26h. More or fewer hooks 162 may be provided on a shorter or longer channel 26h. After a sign or display is fastened to the channel 26h, the channel 26h is engaged by the pole end gripper 30, as shown in FIG. 1, including by gripping the high friction strips 74 at the neck 170 of the channel 26h, and the channel 26h is lifted into position to engage a girder 166 of an open girder ceiling. The pole end gripper 30 is released from the channel 26h by pulling the rope 32. The neck 170 may have holes 172 by which hooks, cord, wire or other fasteners may be affixed to the channel 26h. The sign or display is thereby hung from a girder 166 of an open girder ceiling. The sign or display may be removed using the pole end gripper 30 as well, all without requiring that the person climb a ladder to affix or remove the display or sign.

The hooks 162 may be provided on the pivotable channel 84 so that the display or sign may be rotated to a different viewing angle and not limited by the orientation of the girders in the open girder ceiling. Both the pivotable channel and the channel 26h may be provided in various lengths to accommodate different sizes of signs or displays.

The channels of certain embodiments may be provided in a variety of lengths. One example provides channel lengths of 14 inches, 26 inches, 36 inches and 48 inches.

Although other modifications and changes may be suggested by those skilled in the art, it is the intention of the inventor to embody within the patent warranted hereon all changes and modifications as reasonably and properly come within the scope of his contribution to the art.

I claim:

1. A system for mounting a sign or display, comprising: an elongated channel having a sign or display holding portion and a neck and a hook mounting surface; and at least one hook mounted to the hook mounting surface, the at least one hook including a foot plate, the foot plate being fastened to the hook mounting surface by a fastener, the foot plate being disposed parallel to the hook mounting surface.

2. A system as claimed in claim 1, wherein the sign or display holding portion is configured for holding an edge of a sign or display within the sign or display holding portion.

3. A system as claimed in claim 1, wherein the sign or display holding portion is configured for holding a supporting member, and further comprising:
  a supporting member held in the sign or display holding portion, the supporting member being configured for supporting a sign or display.

4. A system as claimed in claim 3, wherein the sign or display holding portion includes a C-channel, and wherein the supporting member is engaged in the C-channel.

5. A system as claimed in claim 4, wherein the supporting member is configured for suspending a sign or display below the elongated channel.

6. A system as claimed in claim 1, wherein the neck of the elongated channel is configured for engagement by a pole end gripper.

7. A system as claimed in claim 6, wherein the elongated channel includes a neck portion configured for engagement on opposite sides of the neck portion by the pole end gripper, and further comprising: friction strips on the opposite sides of the neck portion, the friction strips being configured for engagement by the pole end gripper during engagement and disengagement of the at least one hook from a mounting location.

8. A system as claimed in claim 1, wherein the at least one hook includes a hook portion extending from the foot plate, the hook portion including first portion extending transverse to the elongated channel and parallel to the hook mounting surface, the first portion being disposed between the foot plate and a hook shaped portion of the at least one hook.

9. A system as claimed in claim 1, wherein the hook mounting surface includes a continuous planar surface extending a full length of the elongated channel; and wherein the at least one hook includes two hooks spaced from one another in a longitudinal direction of the elongated channel, each of the two hooks including a foot plate and a hook portion extending from the foot plate, the foot plate of respective ones of the two hooks being affixed to the continuous planar surface adjacent the opposite ends thereof.

10. A system for mounting a sign or display, comprising:
  an elongated channel having a sign or display holding portion and a neck and a hook mounting surface; and
  at least one hook mounted to the hook mounting surface, wherein:
  the at least one hook includes a foot plate affixed to the hook mounting surface of the elongated channel and a hook portion extending from the foot plate;
  the hook mounting surface includes a continuous planar surface extending a full length of the elongated channel;
  the at least one hook includes two hooks, the foot plate of respective ones of the two hooks being affixed to the continuous planar surface adjacent the opposite ends thereof;
  the hook portion includes a wire shaped in an arc having a radius; and
  the arc shape and the radius of the hook portion are configured for engaging a horizontal member.

11. A system as claimed in claim 10, wherein the hook portion is configured for engaging an elongated horizontal ceiling girder or other structure.

12. A system as claimed in claim 1, wherein the elongated channel includes first and second elongated channel portions pivotally connected to one another, the first and second elongated channel portions being rotatable relative to one another to a plurality of viewing angle positions.

13. A system as claimed in claim 1, wherein the elongated channel includes a plurality of elongated channels of mutually different lengths, each of the plurality of elongated channels having a plurality of hooks mounted thereon for hanging in hooked engagement at a plurality of mounting locations.

14. A system as claimed in claim 1, wherein the elongated channel includes a planar top portion having an underside from which depends the sign or display holding portion and an inverted T-shaped grip portion, the sign or display holding portion and the inverted T-shaped grip portion extending a length of the elongated channel in side-by-side parallel arrangement, the sign or display holding portion being spaced from the inverted T-shaped grip portion in a direction parallel to the planar top portion.

15. A system as claimed in claim 1, wherein the at least one hook includes a plurality of hooks mounted in spaced relation along a length of the elongated channel.

16. A method for mounting a sign or display, comprising:
  affixing a sign or display to a channel having a first hook adjacent a first end of the channel and having a second hook adjacent a second end of the channel, the first and second hooks being spaced apart from one another by a predetermined distance along a length of the channel;
  gripping the channel at a neck of the channel with a pole end gripper;
  positioning the channel at a mounting location using the pole end gripper, the mounting including positioning the hooks at a structure having first and second hook engagement locations, the first and second hook engagement locations being spaced apart by the predetermined distance along the length of the channel;
  affixing the channel at the mounting location, the affixing including engaging the first hook at the first engagement location and engaging the second hook at the second engagement location, the affixing including ensuring that the spaced apart first and second hooks are engaged at the first and second spaced apart engagement locations; and
  releasing the channel from the pole end gripper at the mounting location so that the sign or display is mounted to the mounting location by the first and second hooks spaced engaged at the engagement locations spaced by the predetermined distance;
  wherein the affixing the channel at the mounting location includes engaging hooks on the channel onto a structure at the mounting location.

17. A method as claimed in claim 16, wherein the positioning includes positioning the channel and the sign or display to an overhead position; and
  wherein the affixing includes locating the first and second hooks into a position with arc shaped portions of the first and second hooks extending entirely over a horizontal elongated structure disposed below a ceiling so that the first and second hooks are in hooking engagement with the horizontal elongated structure.

18. A method as claimed in claim 16, wherein the gripping includes gripping friction strips disposed on the neck of the channel with jaws of the pole end gripper.

19. A method as claimed in claim 18, wherein the affixing the sign or display to the channel includes affixing at least one end cap to an end of the channel.

20. A method for mounting a sign or display, comprising:
  affixing a sign or display to a channel;
  gripping the channel at a neck of the channel with a pole end gripper;

positioning the channel at a mounting location using the pole end gripper;

affixing the channel at the mounting location; and releasing the channel from the pole end gripper at the mounting location so that the sign or display is mounted to the mounting location, wherein:

the affixing the channel at the mounting location includes engaging hooks on the channel onto a structure at the mounting location;

the gripping includes gripping friction strips disposed on the neck of the channel with jaws of the pole end gripper;

the affixing the sign or display to the channel includes affixing at least one end cap to an end of the channel; and the affixing the at least one end cap includes engaging first and second fingers of the at least one end cap onto opposite sides of the neck of the channel so that the first and second fingers engage the friction strips on the neck of the channel.

21. A system as claimed in claim 1, wherein the at least one hook includes a hook portion extending from the foot plate, the hook portion including a first portion extending in a direction transverse to the elongated channel and parallel to the foot plate, the hook portion including a second portion extending from the first portion, the second portion being configured in an arc having a radius.

22. A system as claimed in claim 1, wherein the foot plate of the at least one hook is affixed to the hook mounting surface by adhesive tape.

* * * * *